United States Patent [19]

Geurts et al.

[11] 4,061,422
[45] Dec. 6, 1977

[54] LIGHT REFLECTING CASING

[75] Inventors: Petrus T. J. Geurts, Horst; Albert J. Wittenberg, Velden, both of Netherlands

[73] Assignee: Océ-van der Grinten N.V., Venlo, Netherlands

[21] Appl. No.: 661,171

[22] Filed: Feb. 25, 1976

[30] Foreign Application Priority Data

Mar. 4, 1975 Netherlands ..................... 7502508

[51] Int. Cl.² ............................................. G02B 5/10
[52] U.S. Cl. ..................................... 350/293; 362/320
[58] Field of Search ............... 350/288, 293, 296, 310; 240/41 B, 41.35 R

[56] References Cited

U.S. PATENT DOCUMENTS

| 3,751,657 | 8/1973 | Sangiamo et al. | ............ 240/41.35 E |
| 3,966,308 | 6/1976 | Nilson | ................................. 350/293 |

FOREIGN PATENT DOCUMENTS

| 340,257 | 11/1971 | Sweden | .............................. 350/293 |
| 485,390 | 5/1938 | United Kingdom | ................. 350/293 |

OTHER PUBLICATIONS

Koppenhauer et al., Western Electric Technical Digest, No. 18, Apr. 1970, p. 25.

Primary Examiner—F. L. Evans
Attorney, Agent, or Firm—Albert C. Johnston; Gerard F. Dunne

[57] ABSTRACT

A light reflecting casing especially suitable for use in photocopiers is provided by means of a resilient foil, e.g. of stainless steel or of a metallized flexible plastic material, which is held elastically curved with a reflecting side thereof directed toward the light and is shaped exactly to the form of a developable ruled surface by a plurality of support members engaging its other side.

14 Claims, 4 Drawing Figures

LIGHT REFLECTING CASING

The present invention relates to a light reflector, or reflector-casing, having a wall curved to the shape of a developable ruled surface for reflecting the light.

A developable ruled surface as meant herein is a surface, generated by a straight line moving according to a given rule, that can be stretched out in a plane without changing the distance, measured on the surface, between points thereon selected at random. Examples of developable ruled surfaces are general cylindrical surfaces and general conical surfaces. A general cylindrical surface is a surface generated by a straight line moving parallel to itself along a fixed curve, called a directrix. A general conical surface is a surface generated by a straight line moving along a directrix and continuously passing through a fixed point. The directrix of either a general cylindrical or a general conical surface may be a part of a circular, elliptic, hyperbolic, parabolic or other continuous curve. Curved walls of the present type, when formed from a rectangular body, have two opposite curved edges and two opposite uncurved edges. If the body is not rectangular, there still will be curved and uncurved edges but they may, for instance, be divided into several parts. A curved wall formed from such a body is considered herein to be a wall having two opposite curved edges and two opposite uncurved edges. This, however, does not necessarily imply that an uncurved edge corresponds to a straight line; it may follow any given curve in the plane of the curved wall.

Reflective casings having a reflecting wall curved to the form of a developable ruled surface are well known. When such reflector-casings are destined to fit a tubular light source, the curved wall usually has the shape of a general cylindrical surface of which the generating straight line is parallel to the axis of the light source. Reflector-casings of this type are used, e.g., for the illumination of originals in copiers in which an image of the original is projected onto a light-sensitive material by an optical system. It is important in such uses, and especially when the copiers have a light-sensitive system producing a very hard gradation, such as in electrophotographic copiers, to avoid incorrect illumination of the original and to compensate as much as practicable for falling-off of the light toward the edges of the image, which is caused by natural falling-off of the light and mechanical vignetting of the optical system. An optimum distribution of light can be obtained only if the reflector casing of the light source used can be shaped exactly to a particular form and can be kept in that shape. The well known reflector casings are generally composed of stiff materials, in view of their stability. A stiff curved wall is often formed by plastic deformation of a rigid, flat plate which subsequently is fastened to or between two flat side walls. It is difficult, however, to bend such a plate so that its entire surface exactly takes the desired shape.

Reflector casings are also known which have a comparatively thick reflecting wall consisting of a ribbed section produced by extrusion. While such a curved wall does not show the disadvantages mentioned above, its manufacture is very costly unless there is need for large quantities of the same curved wall, for instance in the order of magnitude of 10,000 meters.

The object of the present invention is to provide a reflector-casing by which the above mentioned disadvantages of the known structures are avoided.

According to this invention, a reflector-casing having a wall curved to the shape of a developable ruled surface for reflecting the light is provided by forming this wall of a resilient foil which is engaged by means holding the resilient foil in a curved shape and which is contacted on its side away from the light to be reflected by at least two support members shaping the foil.

The resilient foil consists of a sheet-like material that does not undergo plastic deformation, or does so only slightly, so is elastically deformed, when it is bent to the curvatures required for the curved walls of light reflectors. A foil of such material is considered to be a resilient foil in this connection, even though its elastic deformation may in some hours or days pass partially into plastic deformation when the foil is constantly kept bent.

A material suitable for use according to the invention is a foil of stainless steel having a thickness, e.g., of from 0.05 to 0.3 mm. and provided, if so required, with a reflecting surface which, depending upon the requirements, may have a mirrored, matt or white finish. Highly suitable is a foil of metallized synthetic material having a thickness, e.g., of from 0.1 to 1 mm, such as a polyethylene terephthalate foil to which a reflective coating of aluminum has been applied by vaporization. Such a foil material, by virtue of its high flexibility, can take a desired shape exactly. Although it can easily be pressed out of its curved shape on handling, it will take the original shape again soon after pressure has been removed.

The support members shaping the foil have at least one surface that can be arranged in the plane of the developable ruled surface desired. The resilient foil is shaped to the desired form by contacting it with the surfaces of the foil-shaping support members arranged in the plane of the developable ruled surface. To keep the entire surface of the curved foil wall exactly in the correct shape, it is desirable that the areas of contact be spread over the curved foil according to a regular pattern. Narrow zones of contact extending almost continuously from one uncurved edge to the other uncurved edge of the curved foil are highly effective. These zones of contact can be provided, e.g., by a plurality of foil-shaping supports formed from plates having a thickness of between 1 and 10 mm and arranged perpendicular to the curved surface with their respective edges situated in the desired ruled surface over a distance large enough to permit continuous contact with the curved foil from one uncurved edge to the other uncurved edge. The number of foil-shaping support members required depends on their width, the width of the curved foil measured between its curved edges, and the flexibility of the foil. In general, however, a spacing of from 2 to 6 cm between said supports is sufficient.

The curved foil is kept in contact with the shaping surfaces of the support members with the aid of the holding means. The holding means may consist, e.g., of projections provided on the ends of the shaping surfaces, thus holding the uncurved edges of the curved foil in a fixed position. The holding means may also be provided at the light reflecting side of the curved foil near the curved edges of said foil. In such a case the curved foil can be confined movably between the support members shaping the foil and the holding means, in a simple manner, so as to avoid tensions and undesired deformations which, if the foil were clamped, would occur in close proximity to its clamped portions. Moreover, the curved foil then is free to expand and contract on alterations of temperature, thus avoiding danger of wrinkling that would be detrimental to the required light distribution. This movability of the curved foil is of special importance when the coefficient of expansion of the material used for the supports shaping the foil differs considerably from that of the curved foil.

The reflector-casing ordinarily comprises side walls adjacent to the curved edges of the foil wall. These side walls may be arranged on either side beside the foil next to its curved edges, but in a preferred embodiment of the invention the side walls are positioned at the light reflecting side of the curved foil inside and near its curved edges. In the latter case the side walls can function at the same time as holding means, so that additional holding means are not necessary. The side walls functioning as holding means are very effective, especially if the curved foil wall is composed of a highly flexible material such as a thin metallized plastic foil, when they engage the foil along the entirety, or nearly so, of its curved edges. This condition can be obtained by forming the side walls with edges which over a sufficiently great distance have a curved form fitting that provided for the curved foil.

Preferably the support members shaping the foil are attached to a supporting structure formed by the side walls and members interconnecting these walls, in such a manner that the support members can be removed entirely from said structure, or so that they are detachable at one end and hinged at the other end. Of course, the hinged attachment may also be detachable, thus enabling simple replacement of the curved foil wall by another having the same form as the one replaced.

The reflector-casing according to the invention can be manufactured without need for plastic deformation of parts determining the shape of the curved reflecting wall. The foil-shaping supports, also the side walls as far as they contribute to the shaping of the curved foil wall, can be obtained very exactly in the desired form, by conventional techniques such as milling, punching, casting and injection molding, from a metal or a plastic having a thickness that is sufficient to prevent permanent deformation under normal handling conditions.

The reflector-casing may, of course, be provided with several curved foils having their form determined by one and the same assembly of shaping support members or by separate assemblies of such support members. The curved foils may together form a large curved surface, or may be arranged more or less opposite to one another.

The invention will be further evident from the following description and the accompanying drawings of illustrative embodiments thereof. In the drawings.

Figure 1:
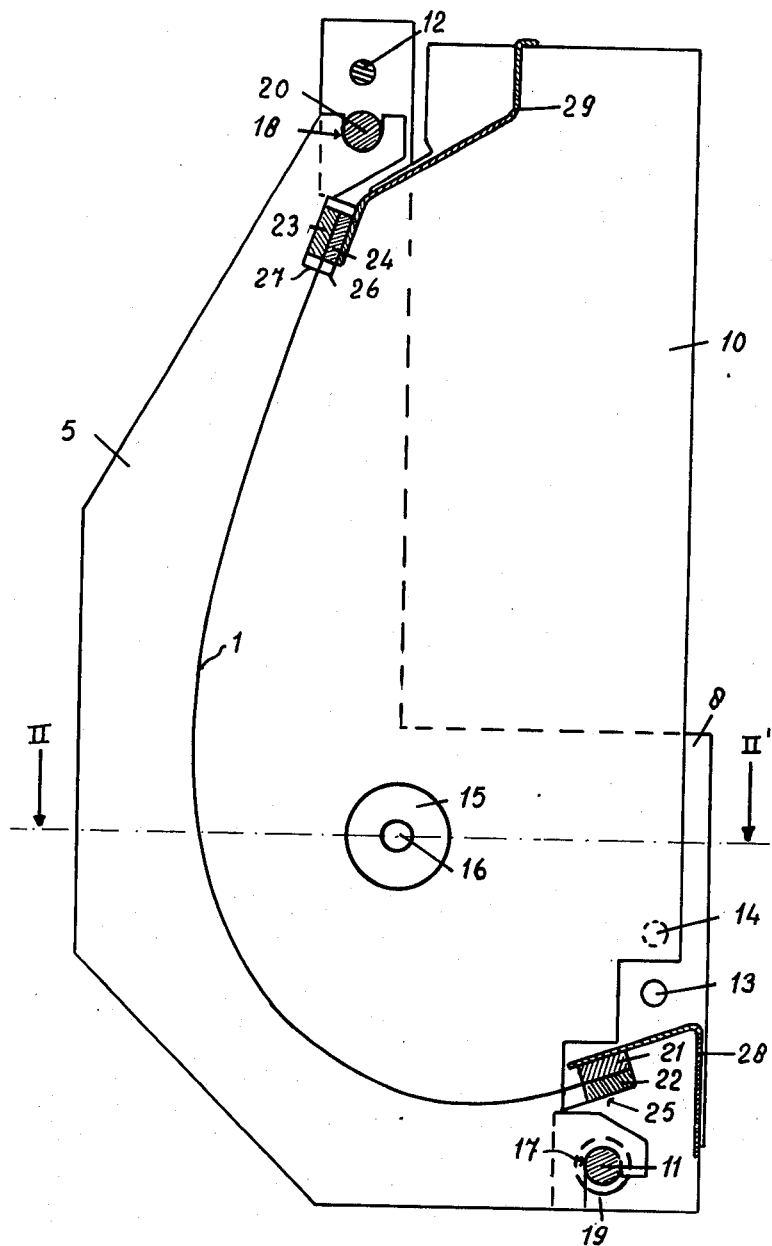
FIG. 1 is a schematic cross section through a reflector-casing embodying the invention, taken at line I—I' in FIG. 2.
Figure 2:
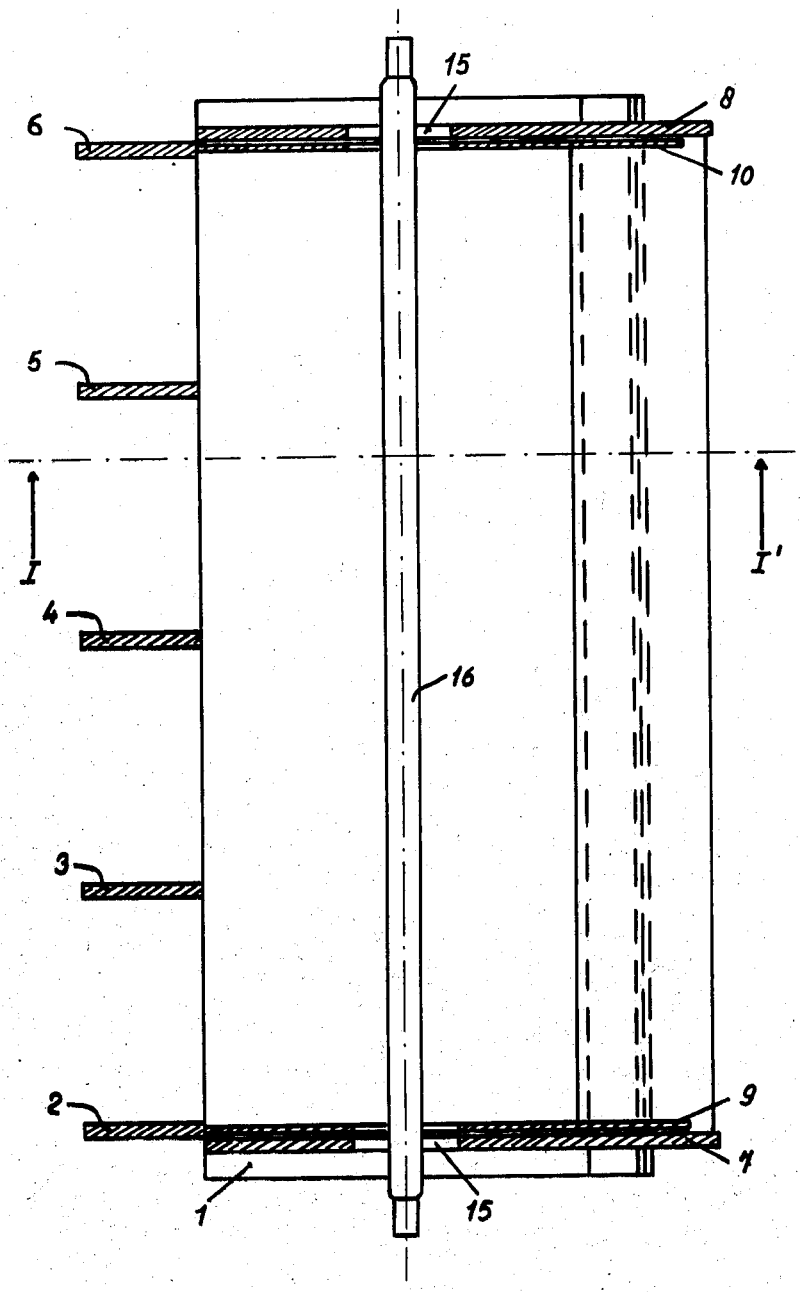
FIG. 2 is a schematic cross section through the same reflector-casing, taken at line II—II' in FIG. 1.
Figure 3:
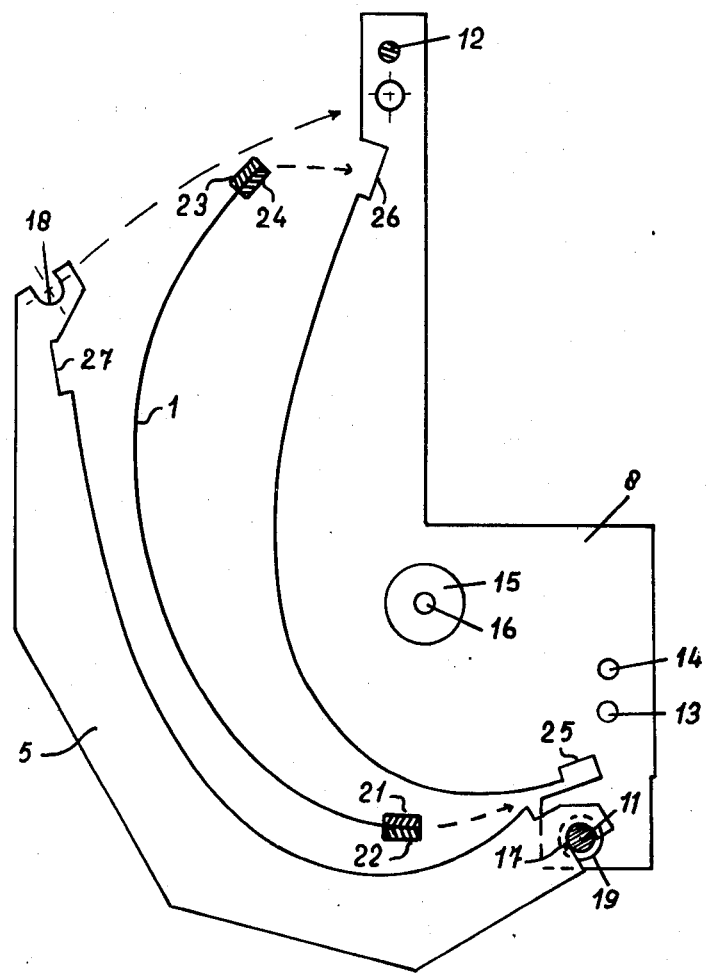
FIG. 3 is a schematic cross section through the same reflector-casing, taken at line I—I' in FIG. 2, with the parts shown in an open state and some components omitted for clarity of illustration.

The reflector-casing shown in FIGS. 1, 2 and 3 comprises a resilient foil 1 of metallized synthetic material kept bent in the form of a part of a general cylindrical surface the directrix of which has a radius of curvature that is comparatively small near one end and increases towards the other end. On the convex side, the foil is kept in the required curved shape by five identical foil-shaping supports 2 to 6 inclusive, consisting of equally spaced plates 3 mm thick, which are placed perpendicular to the generating straight line of the general cylindrical surface and which, on the side directed to foil 1, have an edge lying in the plane of the general cylindrical surface. On the concave side, the curved foil 1 is held in the curved shape by two flat side walls 7 and 8 located near the edges of the foil, which walls are also perpendicular to the generating straight line of the cylindrical surface, and on the border directed toward the foil 1 each side wall has an edge fitting the curved shape of said foil.

The inner sides of the two side walls 7 and 8 are lined with mirrored metal plates 9 and 10, respectively. To form a rigid supporting structure, the side walls are interconnected by connecting rods 11 and 12, which extend in a perpendicular position between the side walls and are fitted in holes provided in the side walls adjacent to two opposed edges thereof. Both side walls are also provided with two holes 13 and 14 for fitting the reflector-casing in a copier, and with one wide hole 15 in which a tubular lamp 16 is fitted perpendicularly between the side walls in lamp holders (not shown).

Each of the five foil shaping supports 2–6 is provided with recesses 17 and 18, respectively, adjacent to the opposite ends of its edge abutting the foil 1. The foil shaping supports are hinged at one end to the rigid supporting structure by means of the recesses 17 fitting on the connecting rod 11, and they are kept equally spaced apart by four spacing sleeves 19 pushed over the connecting rod. At their other end, they are connected detachably to the supporting structure by a removable rod 20 which is slid through an opening in each of the side walls and engaged in the recesses 18.

The resilient foil 1 is clamped at one end, or uncurved edge, between two strips 21 and 22, and at the other between two strips 23 and 24. The strip pair 21, 22 is loosely retained at each end in a recess 25 provided in either side wall, and the strip pair 23, 24 is retained so that it is freely movable in the plane of the foil 1, between a recess 26 provided in each side wall and a recess 27 provided in each of the supports shaping the foil. Near the uncurved edges of the foil 1, two non-reflecting partitions 28 and 29 are fixed in place as extensions of the plane of the foil, in order to prevent undesirable light-scattering.

FIG. 3 shows the shape of the side walls and of the supports shaping the foil, as well as the pivotability of said supports about the connecting rod 11. For greater clarity, this figure omits showing the rod 20 shown in FIG. 1, as well as the mirrored metal plates 9 and 10 and the non-reflecting partitions 28 and 29.

In an alternative form of the reflector-casing of FIGS. 1 to 3, inclusive, the foil 1 is positioned between the shaping support members and the side walls without use of the edge clamping strips 21 to 24 inclusive.

Figure 4:
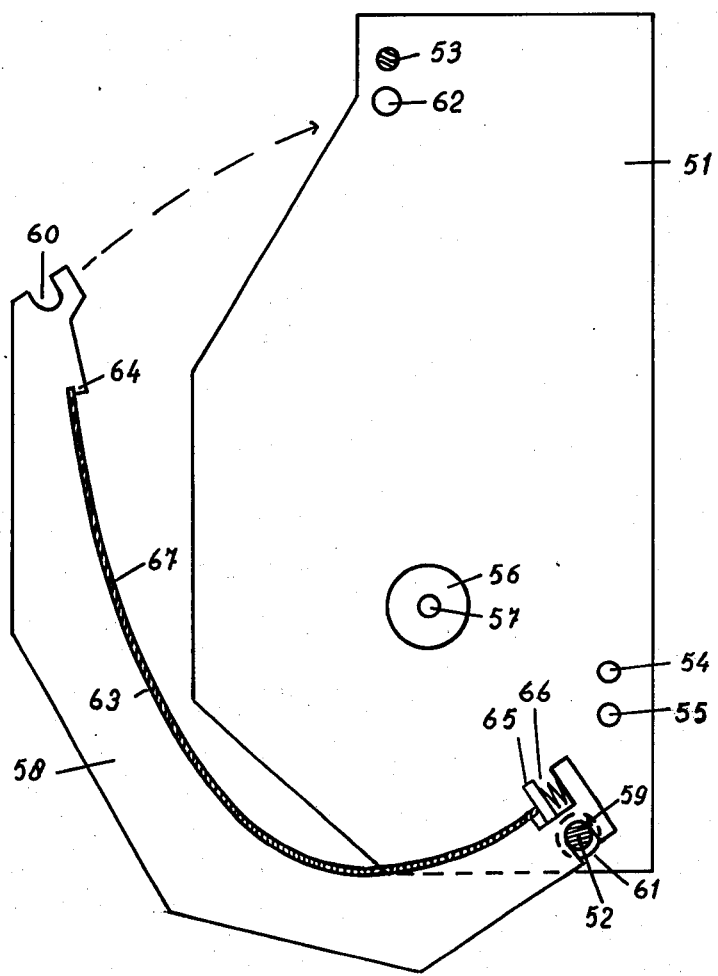
FIG. 4 is a schematic cross section through another embodiment of the invention, shown in an open state.

The embodiment of the invention according to FIG. 4 comprises two metal side walls 51 which are spaced apart in parallel relation and at their inner side are polished to a mirror finish. These side walls, together with two connecting rods 52 and 53 mounted perpendicularly between them, form a rigid supporting structure which is provided with holes 54 and 55 in the side walls for fixing the reflector-casing in a copier. The side walls also have a wide opening 56 in which a tubular lamp 57 is fitted perpendicularly between said walls in lamp holders (not shown).

At one side of the lamp, five identical foil-shaping support members 58, consisting of plates 4 mm thick, are arranged in parallel relation to and at mutually equal distances between the side walls. Recesses 59 and 60 are provided in opposite end portions of these foil shaping supports which at one end are hinged by the recesses 59 to the connecting rod 52 and are kept equally spaced apart by four spacing sleeves 61 pushed over that connecting rod. The recesses 60 are brought in line with an opening 62 present in both side walls, and locked in place by a detachable bar (not shown).

At their side directed toward the lamp, the foil shaping supports 58 each have an edge 63 formed with a curvature that fits the plane of a segment of a general cylindrical surface positioned with its concave side directed toward the lamp. The curved edge 63 is bounded at one end by a fixed projection 64, and at the other end by a projection 65 that is movable along the extension of said edge and is seated on the end of the support through a compression spring 66. A resilient foil 67 of stainless steel is confined between the projections 64 and 65, with the projection 65 pressing the foil against the curved edges 63 so that the foil takes the shape of the general cylindrical surface. The spring 66 allows the foil 67 to move in its own plane with changes of its temperature.

What is claimed is:

1. A reflecting casing comprising a resilient foil having a surface for reflecting light from one side of said foil, means including a plurality of support members having aligned curved surfaces for engaging the other side of said foil and shaping said foil to the form of a developable ruled surface, and means for holding said foil curved elastically into engagement with said curved surfaces, yet keeping the curved foil movable in its own plane, said holding means engaging edge portions only of said foil.

2. A reflecting casing according to claim 1, said support members beng regularly spaced apart and said curved surfaces thereof extending in contact with said foil entirely, or nearly so, from one to the other of its uncurved edges, said holding means comprising oppositely disposed casing side walls having curved edges engaging said one side of said foil near its curved edges.

3. A reflecting casing according to claim 2, said curved edges of said side walls extending entirely, or nearly so, from one to the other of the uncurved edges of said foil.

4. A reflecting casing according to claim 1, further comprising a supporting structure including casing side walls respectively adjacent to opposite curved edges of said foil and members interconnecting said side walls, and means attaching said support members detachably to said supporting structure.

5. A reflecting casing according to claim 1, further comprising a supporting structure including casing side walls respectively adjacent to opposite curved edges of said foil and members interconnecting said side walls, said support members extending in contact with said foil substantially from one to the other of its uncurved edges, means hinging said support members to said supporting structure at one of their ends and means attaching said support members thereto detachably at their other end.

6. A reflecting casing according to claim 1, said foil being a foil of stainless steel having a thickness of from 0.05 to 0.3 mm. and a light-reflective surface.

7. A reflecting casing according to claim 1, said foil being a foil of a metallized synthetic resin material having a thickness of from 0.1 to 1 mm.

8. A reflecting casing according to claim 1, said foil being a foil of a polyethylene terephthalate resin having a thickness of 0.1 to 1 mm., said reflecting surface being a coating of aluminum applied by vaporization.

9. A reflecting casing according to claim 1, said support members being regularly spaced apart and said curved surfaces thereof extending in contact with said foil substantially from one to the other of its uncurved edges, said holding means comprising fixed projections on said support members at one end thereof and engaging one uncurved edge of said foil, movable projections seated on said support members at the other end thereof and engaging the other uncurved edge of said foil and means for resiliently biasing said movable projections against said other uncurved edge so as to hold said foil curved against said curved surfaces.

10. A reflecting casing comprising a resilient foil having a surface for reflecting light from one side of said foil, a plurality of support members for engaging the other side of said foil and shaping said foil to the form of a developable ruled surface, said support members being plates about 1 to 10 mm. thick being regularly spaced over said other side by a distance of about 2 to 6 cm. and each extending perpendicularly in contact with said foil entirely, or nearly so, from one to the other of its uncurved edges, a supporting structure including oppositely disposed casing side walls and members interconnecting said side walls, said side walls having curved edges respectively engaging said one side of said foil near its curved edges for holding said foil in a curved posture for engagement by said support members yet keeping the curved foil movable in its own plane, means hinging said support members to said supporting structure at one of their ends and means detachably attaching said support members to said structure at their other end.

11. A reflecting casing according to claim 10, said foil being a foil of stainless steel having a thickness of from 0.05 to 0.3 mm. and a light-reflective surface.

12. A reflecting casing according to claim 10, said foil being a foil of a metallized synthetic resin material having a thickness of from 0.1 to 1 mm.

13. A reflecting casing according to claim 10, said foil being a foil of a polyethylene terephthalate resin having a thickness of 0.1 to 1mm., said reflecting surface being a coating of aluminum applied by vaporization.

14. A reflecting casing comprising a resilient foil having a surface for reflecting light from one side of said foil, a plurality of support members having aligned curved surfaces for engaging the other side of said foil and shaping said foil to the form of a developable ruled surface, said support members being regularly spaced apart over said other side and each extending perpendicularly in contact with said foil entirely, or nearly so, from one to the other of the uncurved edges of said foil, and a supporting structure including oppositely disposed casing side walls and members interconnecting said side walls, said side walls having curved edges respectively engaging said one side of said foil near its curved edges for holding said foil in a curved posture for engagement by said curved surfaces yet keeping the curved foil movable in its own plane.

* * * * *

UNITED STATES PATENT OFFICE
CERTIFICATE OF CORRECTION

Patent No. 4,061,422                    Dated December 6, 1977

Inventor(s) Petrus T. J. Geurts and Albert J. Wittenberg

It is certified that error appears in the above-identified patent and that said Letters Patent are hereby corrected as shown below:

Col. 5, line 43 (claim 2, line 2), in place of "beng" read -- being --

Col. 6, line 28 (claim 10, line 7), after "spaced" read -- apart --

Signed and Sealed this

Second Day of May 1978

[SEAL]

Attest:

RUTH C. MASON
Attesting Officer

LUTRELLE F. PARKER
Acting Commissioner of Patents and Trademarks